3,476,821
DISPROPORTIONATION OF ALKYL AROMATICS WITH DECATIONIZED MORDENITE CONTAINING A SULFIDED METAL
John T. Brandenburg, Hopewell Junction, John M. Crone, Jr., Fishkill, and Robert M. Suggitt, Wappingers Falls, N.Y., assignors to Texaco Inc., New York, N.Y., a corporation of Delaware
No Drawing. Filed Feb. 29, 1968, Ser. No. 709,189
Int. Cl. C07c 3/58
U.S. Cl. 260—672
18 Claims

ABSTRACT OF THE DISCLOSURE

Alkylaromatics are disproportionated in the presence of a decationized mordenite having a silica to alumina mole ratio of between about 10:1 and about 100:1 preferably between about 20:1 and about 60:1 and containing a sulfided Group VIII metal.

BACKGROUND OF THE INVENTION

This invention relates to the disproportionation of alkyl aromatic hydrocarbons. In one of its more specific aspects, the present invention relates to a process for the disproportionation of alkylaromatic hydrocarbons in the presence of a crystalline alumino-silicate containing a sulfided metal catalyst. It is particularly concerned with the disproportionation of alkylbenzenes in the presence of a decationized mordenite having a silica to alumina mole ratio greater than about 10 to 1 and containing a sulfide Group VIII metal.

It has been proposed heretofore to catalytically hydrodealkylate alkylaromatic hydrocarbons to produce benzene or naphthalene with metallic catalysts, such as molybdenum oxide or cobalt molybdate, supported on silica-alumina. More recently crystalline alumino-silicates such as Zeolite X and Y, faujasite and hydrogen mordenite have been found to be effective dealkylation catalysts. In a copending application, substantially increasing the silica to alumina ratio of hydrogen mordenite is said to enhance the dealkylation activity of this crystalline zeolite. Hydrogen mordenite has also been proposed as an effective disproportionation catalyst for alkylaromatic hydrocarbons.

Although mordenite is usually available as sodium mordenite it must be converted to the hydrogen form to be an effective catalyst. The hydrogen mordenites used heretofore as a disproportionation catalyst have been decationized mordenites where the mole ratio of silica to alumina was about 10:1, substantially the same as in the sodium form of this zeolite.

Although decationized mordenite has heretofore been used as a disproportionation catalyst, improvements in the catalyst itself which will permit a similar operation at a substantially increased yield of product and at a significantly lower temperature would be highly desirable.

SUMMARY OF THE INVENTION

We have found that significant improvements are realized in a process for disproportionating alkylaromatic hydrocarbons in the presence of a decationized mordenite catalyst if a sulfided metal catalyst is associated with the mordenite and if the ratio of silica to alumina in the mordenite is substantially higher than that is a decationized mordenite whose preparation was limited to the removal of substantially all of the sodium ions. By alkylaromatic hydrocarbons, we mean alkylbenzenes having one to three $C_1$–$C_4$ alkyl groups and methylnaphthalene, with methylbenzenes particularly preferred. By a substantially higher silica to alumina ratio, we mean a ratio greater than about 10 to 1, preferably above about 20 to 1. However, although silica to alumina ratios greater than those previously used in the disproportionation of aromatic hydrocarbons result in an improved process, the preferred mole ratio is between about 20:1 and 60:1 and little significant improvement is achieved with a mordenite whose silica to alumina mole ratio is greater than about 100:1.

More particularly, we have found that a decationized mordenite, i.e., hydrogen mordenite, having a silica to alumina mole ratio greater than about 10:1 but less than about 100:1, preferably between about 20:1 and about 60:1, impregnated with a sulfided Group VIII metal is an extremely active catalysts for the disproportionation of alkylaromatic hydrocarbons. Further, a sulfur-containing compound must be present in the feedstock being processed to maintain the catalyst metal in the sulfided state, particularly if the disproportionation is being conducted in the presence of hydrogen, to achieve the maximum benefits from our invention. Our process permits an increased selectivity for disproportionated aromatic products because of the lower yields of hydrocarbon gases and saturated hydrocarbons. In addition the use of the sulfided catalyst produces a substantially increased catalyst life as compared to a process employing a hydrogen mordenite having a silica to alumina ratio within our preferred range but containing an unsulfided catalyst metal.

The disproportionated aromatic hydrocarbons produced by our process have a variety of uses. They have utility as solvents or as raw materials for the manufacture of numerous industrial chemicals and products. For example, xylene is useful as a raw material for such chemical intermediates as xylidine, phthalic anhydride, terephthalic acid and iso-phthalic acid. Para-xylene finds particular utility as a raw material in the manufacture or polyester fiber. Benzene produced from our process is useful as a solvent and as a raw material for a variety of chemicals, such as styrene, phenol, nitrobenzene and cyclohexane, which are in turn used to produce such materials as synthetic rubber, detergents and insecticides. Naphthalene is principally used for making phthalic anhydride, organic dyes, insecticides and solvents.

DESCRIPTION OF THE PREFERRED EMBODIMENTS

In accordance with the present invention, a hydrocarbon feedstock containing alkylaromatic hydrocarbons and a sulfur compound is contacted with hydrogen mordenite having a silica to alumina mole ratio greater than about 10 to 1 and impregnated with a sulfided Group VIII metal at a temperature effective to disproportionate at least some of the alkylaromatic hydrocarbons to products having a greater number and lower number of carbon atoms. Since little, if any improvement has been observed in utilizing a mordenite having an exceptionally high silica to alumina ratio, the practical upper limit for the mordenites useful in the process of our invention are those having silica to alumina mole ratios no greater than about 100 to 1, with the preferred mole ratio being between about 20 to 1 and 60 to 1.

Alkylaromatic hydrocarbons usefully employed in the practice of our invention include alkylbenzenes having one to three alkyl groups where the alkyl group is a $C_1$–$C_4$ alkyl. Another hydrocarbon which may be employed is methylnaphthalene. The feedstocks can be any of these alkylaromatic hydrocarbons in substantially pure form or mixtures thereof. In addition, hydrocarbon fractions rich in any of these useful compounds or mixtures thereof may be effectively employed. Specific examples include toluene, xylene, mesitylene, ethylbenzene and cumene.

The catalyst used in our invention is a particular form of crystalline alumino-silicate known as mordenite. Although mordentite is naturally occurring in the sodium form, synthetic mordenites have become commercially available and are extremely useful in the process of our invention. In its sodium form mordenite usually has minimal catalytic activity and must therefore be converted to the hydrogen or decationized form before it finds utility in catalytic processes.

Mordenite structures are characterized by parallel sorption channels of uniform cross-section. The sorption channels are parallel to the C-axis of the crystal and are elliptical in cross-section. The sorption channels dimensions of sodium mordenite, based on crystallographic studies, have been reported as having a minor diameter of 5.8 to 5.9 A., a major diameter of 5.0–7.1 A. and a free diameter of 6.6 A.; the hydrogen form of mordenite is believed to have somewhat larger pore openings with a minor diameter of not less than about 5.8 A. and a major diameter less than 8 A.

Although mordentite occurs in nature, synthetic mordenites are commerically available from the Norton Company under the trade name Zeolon. These mordenites have a chemical composition, on a unit cell basis, of

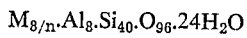

$$M_{8/n} \cdot Al_8 \cdot Si_{40} \cdot O_{96} \cdot 24H_2O$$

where M may be sodium, hydrogen or some other exchangeable cation and $n$ is the valence of the cation. The high ratio of silica to alumina of 10:1 in the synthetic mordenite permits complete acid exchange to a stable hydrogen form and imparts excellent chemical and thermal stability. The effective working diameter of hydrogen mordenite prepared by acid treating synthetic sodium mordenite and marketed under the trade name Zeolon H appears to be in the range of 8 to 10 A. as indicated by absorption of aromatic hydrocarbons.

The sodium form of mordenite is not effective for disproportionation regardless of whether the temperature is within th range usually employed to effect disproportionation and regardless of catalyst additions. However, the hydrogen form of synthetic mordenite having a sodium content of less than 5 weight percent is exceptionally effective for dealkylating alkylaromatic hydrocarbons. Decationized mordenite, i.e., mordenite in the hydrogen form, may be produced by ion exchange of the sodium in the mordenite with ammonium ions followed by heating or calcining to drive off ammonia. However, an extremely effective method of producing the decationized mordenite is by acid treatment. In addition to decationizing the mordenite, acid treatment may also remove some of the aluminum from the zeolitic structure, thereby increasing the relative proportions of silica to alumina in the zeolite. In its sodium form, both natural and synthetic mordenite have a mole ratio of silica to alumina of about 10 to 1. Hydrogen mordenite also has a silica to alumina mole ratio of about 10 to 1 but acid treating the sodium mordenite to produce the decationized form may remove aluminum sufficiently to increase the silica to alumina ratio slightly above 10 to 1. In its decationized form mordenite is an effective catalyst for disproportionating alkylaromatic hydrocarbons with or without the addition of catalytic metals. We have found, surprisingly, that further acid leaching of a mordenite zeolite in hydrogen form and impregnating it with a Group VIII metal which is subsequently sulfided enhances the catalytic activity of the mordenite when employed in an aromatic disproportionation process resulting in lower operating temperature, greater selectivity, reduced cracking, less saturated products and longer catalyst life as compared to mordenite catalysts used heretofor.

The acid leaching used to produce the mordenite catalysts employed in our process must be severe enough to substantially increase the silica to alumina mole ratio of the mordenite to above about 10:1. However, the acid leaching must not be so severe as to destroy the crystalline structure of the mordenite. Further, little improvement has been observed in our process where the silica to alumina ratio of the mordenite is greater than about 100:1. Consequently, as a practical limit the acid leaching should be severe enough to produce a mordenite having a silica to alumina ratio between 10:1 and 100:1, preferably between about 20:1 and 60:1.

Acid leaching may be suitably effected with mineral acids which will selectively remove aluminum without destroying the zeolitic crystalline structure, for example, hydrochloric or sulfuric acid. Boiling dilute hydrochloric acid is extremely effective in removing the aluminum. Following the leaching, the mordenite is water washed and calcined, with or without catalytic metal additions, in air at elevated temperatures up to about 1000° F. Because of this preparation method, the catalysts useful in our invention are referred to hereinafter for convenience as severely acid leached mordenites.

Although we have described an acid leaching technique for preparing the mordenite catalysts used in our process, this has been used for purposes of illustration and not of limitation as there is no intention of excluding any equivalents. Thus, hydrogen mordenites having silicia to alumina mole ratios between about 10:1 and about 100:1 prepared by other methods may also be employed in our process.

Structurally mordenite is significantly distinguishable from other zeolites. Mordenite has a chain type zeolite structure in which a number of chains are linked together into a srtuctural pattern with parallel sorption channels similar to a bundle of parallel tubes. In contrast Type A, Type X and Type Y synthetic zeolites and faujasite have three dimensional crystalline cage structures having 4 to 6 windows or pore openings per unit cell through which access may be had to the inner cavity or unit cell of the zeolitic molecular sieve. Although these three dimensional molecular sieves are important catalysts in a number of hydrocarbon reactions, they are not as effective for the disproportionation of alkylaromatic hydrocarbons as the severely leached mordenite structures used in our process.

In a preferred method of operation hydrocarbon feedstocks containing substantial quantities of alkylaromatic hydrocarbons are passed into contact with a zeolite of the mordenite type in hydrogen form and having a silica to alumina mole ratio between about 10:1 and 100 to 1 preferably between about 20:1 and 60:1 under relatively mild disproportionation reaction conditions. A sulfided catalyst metal, selected from the Group VIII metals is associated with the mordenite. The catalyst metal may be incorporated in or on the mordenite base either by ion exchange or impregnation techniques well known in the art of catalyst manufacture. The platinum metals, platinum, palladium, rhodium and ruthenium, are effective if present in concentrations of 0.05–2.0 weight percent. The other Group VIII metals, nickel, cobalt and iron, should constitute 0.5–10.0 weight percent of the catalyst. Sulfided Group VI-B metals may also be effectively associated with the mordenite in concentrations of 0.5–20.0 weight percent and may be used in combination with the sulfided Group VIII metals, especially cobalt and nickel.

To achieve the benefits of our process the catalyst metal deposited on the mordenite must be converted to the sulfide and maintained in that condition during a processing run. The metal may be sulfided by pretreating the catalyst at a temperature of 400–800° F., with a carrier gas of hydrogen or nitrogen and containing, for example, hydrogen sulfide. In another technique, the catalyst can be heated to operating temperature and then contacted with the liquid feed enriched with a sulfur-containing compound, such as, for example, carbon disulfide, methyl sulfide or ethyl mercaptan.

Since the sulfided catalyst metal may be reduced during a run, particularly if the disproportionation is being optionally conducted in the presence of hydrogen, the introduction of minor amounts of sulfur compounds into the reaction vessel will maintain the catalyst in a sulfided condition. This may be done by incorporating compounds such as, carbon disulfide, methyl sulfide or ethyl mercaptan in the feedstream or adding hydrogen sulfide to the hydrogen. These additions should be sufficient to maintain a minimum concentration of hydrogen sulfide in the gas phase of about 300 p.p.m. We have found that this low concentration achieves the desired result without reacting to contaminate the disproportionation products.

Although hydrogen has often been employed in prior art catalytic disproportionation processes, its use in our process is not critical. The use of hydrogen is recommended through since it will prolong the useful life of the catalyst.

Hydrogen mordenite having a silica to alumina mole ratio greater than about 10 to 1 and containing 0.05 to 10 weight percent of a Group VIII sulfide is an effective catalyst for use in our invention. A preferred catalyst has a silica to alumina ratio of between 20 to 1 and 60 to 1 and contains 4 to 6 weight percent of nickel sulfide or cobalt sulfide. These preferred catalysts may optionally be combined with molybdenum or tungsten sulfide. These catalysts are highly resistant to high temperatures permitting regeneration by either oxidation techniques or high temperature hydrogen treatment.

Regeneration of the catalyst by oxidation involves controlled burning of the contaminants from the surface of the catalyst structure with air, or a mixture of inert gases with air or oxygen. Regeneration may also be effected by treatment of the catalyst with hydrogen at temperatures generally above the usual conversion reaction temperature. We have found that severely acid leached mordenite catalyst structures will withstand high temperatures, e.g., temperatures above 1200° F. and possibly as high as 1500° F., without evidence of damage to the catalyst or deleterious effect on the activity of the catalyst.

In general, preferred operating conditions or aromatic disproportionation as practiced by our invention in the presence of a hydrogen mordenite having a silica to alumina mole ratio between 10 to 1 and 100 to 1, preferably between about 20 to 1 and 60 to 1 and containing a sulfided Group VIII or Group VI–B catalytic metal thereon are: space velocities in the range of about 0.1 to 10 liquid volumes per hour per volume of catalyst, preferably 0.5 to 4 LHSV; temperatures in the range of about 400 to 750° F., preferably 450 to 650° F.; pressures within the range of 0 to 1000 p.s.i.g., preferably in the range of 10 to 500 p.s.i.g. and, when hydrogen is used, hydrogen concentrations of 100 to 10,000 s.c.f./bbl. of feed, preferably 5000 to 10,000 s.c.f./bbl.

The catalyst may be in the form of granules, e.g., 10 to 25 mesh Tyler Standard Screen Scale, and preferably is in the form of pellets or extrusions having a diameter of about ⅛ inch. The reaction is suitably carried out over a fixed bed of catalyst with feedstock passing downwardly through the catalyst bed.

Operating temperature and catalyst activity are correlated with space velocity to give reasonably rapid processing of the feedstock at catalyst deactivation rates which insure maximum on-stream time of the catalyst between periods of regeneration. On-stream time between periods of regeneration usually range from 2 months to 2 years.

As the catalyst ages, its activity for the desired reaction tends to slowly diminish. The catalyst may be maintained at or periodically brought back to approximately its initial level of activity by increasing the operating temperature as the catalyst ages.

The following examples illustrate the practice and advantages of the invention.

Example I

This example shows the increased disproportionation activity obtained in increasing the silica to alumina ratio of mordenite.

A series of runs were made using a microreactor holding the granular catalyst under test. In each run the liquid feed was continuously injected into the reactor at a steady rate over a two hour period. A hydrogen atmosphere was maintained in the reactor during the runs. Reaction products were condensed in a receiver held at 20° F.; the noncondensibles, $C_1$ to $C_5$ products, were passed to a gas chromatograph for analysis. The condensed product was collected and analyzed in a second gas chromatograph.

Four runs were made in which toluene was disproportionated with hydrogen mordenite having various silica to alumina ratios and which contained no added metals. All runs were conducted at 550° F., 200 p.s.i.g. hydrogen pressure and a toluene space velocity of 2 weight of toluene per weight of catalyst per hour (WHSV). The results are shown in Table I below.

TABLE I

| $SiO_2/Al_2O_3$ mole ratio of mordenite: | Product analysis, wt. percent of benzene and $C_8$ aromatics |
|---|---|
| 14:1 | 5.8 |
| 19:1 | 15.5 |
| 24.1 | 30.0 |
| 97:1 | 5.0 |

Example II

This example shows that ethyl benzene can be disproportionated with an acid leached mordenite.

In a method similar to that of Example I, ethyl benzene was introduced into the microreactor at a 2 WHSV. The reactor temperature was 450° F. and the hydrogen pressure was 200 p.s.i.g. The silica to alumina mole ratio of the mordenite was 24 to 1. Gas chromatograph analysis of the products showed the weight percentage of benzene plus diethyl benzenes to be 39.1%.

Example III

The example shows that the addition of a hydrogenation component to acid leached mordenite extends the active life of the catalyst.

A series of disproportionation runs were conducted with a microreactor as in Example I. Toluene was fed to the reactor at a space velocity of 2 WHSV, the reactor temperature was 550° F. and the hydrogen pressure was 200 p.s.i.g. The toluene feed contained 0.1 wt. percent S as carbon disulfide and all catalysts with added metals were sulfided before use. The effluent stream was analyzed for disproportionation products, $C_6$ plus $C_8$ aromatics, at the end of one hour and again at the end of two hours. The ratio of these results supplies a measure of the relative activity of the catalyst with time. The results are presented in Table II below.

TABLE II

| $SiO_2/Al_2O$ Mole Ratio of Mordenite | Catalyst Wt. | | Product Analysis, Wt. Percent $C_6+C_8$ aromatics | | Product Ratio, 120 min./ 60 min. |
|---|---|---|---|---|---|
| | Metal | Percent | 60 min. | 120 min. | |
| 17:1 | None | | 15.5 | 9.1 | 0.59 |
| 24:1 | do | | 26.3 | 17.5 | 0.67 |
| 52:1 | NiS | 5.2 | 25.8 | 22.3 | 0.86 |
| 24:1 | PtS | 0.4 | 31.0 | 28.1 | 0.91 |
| 24:1 | $WS_2$ | 10 | 24.9 | 18.3 | 0.74 |
| 24:1 | CoS | 5 | 16.0 | 20.8 | 1.3 |
| 24:1 | $MoS_2$ | 10 | 13.4 | 13.0 | 0.97 |

The substantially higher product ratio for those runs where metals were associated with the mordenite demonstrate that these metal additions extend the active life of the catalyst.

Example IV

This example shows that the overactivity of the hydrogenation component can be reduced by sulfiding the added metals.

The runs were conducted as in Example I with toluene feed to the reactor at a space velocity of 2 WHSV and a temperature of 550° F. and a hydrogen pressure of 50 p.s.i.g. Runs were made with sulfided and unsulfided metal impregnated hydrogen mordenite having a silica to alumina mole ratio of 24 to 1. When a sulfided catalyst was tested, 0.1 wt. percent S as carbon disulfide was added to the toluene feed. The results are shown in Table III below.

TABLE III

| Metal Addition | Weight, Percent | Product Analysis, Wt. Percent | | |
|---|---|---|---|---|
| | | Gas | Saturates | $C_6+C_8$ aromatics |
| NiO | 0.6 | 0.7 | 2.5 | 13.6 |
| NiS | 5.3 | 0.2 | 0.0 | 25.8 |
| Pd | 0.05 | 3.9 | 2.5 | 33.5 |
| PdS | 0.2 | 2.7 | 1.7 | 36.3 |

The reduction in the iyeld of gas and saturated hydrocarbons by sulfiding the metal catalyst is readily apparent.

Example V

This example demonstrates that the process of our invention will maintain product yields over prolonged periods.

A series of three disproportionation runs were made with a reactor containing 100 cc. of catalyst. In each case the hydrogen mordenite had a silica to alumina mole ratio of 24:1. In the first run the mordenite contained no added metals; in the second and third runs, 5 wt. percent NiS was added to the mordenite. Toluene was the feed in all runs with 0.1% S as carbon disulfide added to the feed in Runs 2 and 3.

The conditions in Run 1 were: 550° F., 200 p.s.i.g. hydrogen, 7:1 $H_2$/toluene mole ratio, 1.5 LHSV (liquid volumes of feed per volume of feed per hour). Although the initial yield of benzene plus $C_8$ aromatics was approximately 19 wt. percent it decreased to 4.3 wt. percent after only 12 hours.

The conditions in Run 2 were: 550° F., 500 p.s.i.g. hydrogen, 5:1 $H_2$/toluene mole ratio and 1.0 LHSV. The yield of $C_6+C_8$ aromatics stabilized at 28.6 wt. percent with no decline in activity after 48 hours.

The conditions in Run 3 were: 575° F., 500 p.s.i.g. hydrogen, 5:1 $H_2$/toluene mole ratio and a 1.0 LHSV for the first 12 hours of the run. A yield of $C_6+C_8$ aromatics of 50 wt. percent was obtained which dropped to 33 wt. percent when the space velocity was increased to 2.3 LHSV during the next 12 hour period. At this temperature the equilibrium composition is approximately 50 wt. percent toluene and 50 weight percent $C_6+C_8$ aromatics.

These runs show that at substantially lower temperatures than are required by other disproportionation processes, employing mordenite catalysts, our process, wherein sulfided metals are associated with acid leached mordenite, exhibits an increased selectivity maintainable over extended periods.

The terms and expressions used herein are used as terms of description and not of limitation. There is no intention by the use of such terms and expressions of excluding any equivalents as it is recognized that various modifications and departures from the process described above can be made within the scope of the invention claimed.

We claim:

1. A process for disproportionating alkylaromatic hydrocarbons which comprises contacting said hydrocarbons admixed with a sulfide compound under disproportionation conditions with a hydrogen aluminosilicate derived by increasing the silica to alumina mole ratio of mordenite to greater than about 10 to 1 and a sulfided Group VIII metal associated with the aluminosilicate.

2. A process according to claim 1 wherein the hydrocarbons are selected from the group consisting of methylnaphthalene and alkylbenzene having one to three $C_1$–$C_4$ alkyl groups.

3. A process according to claim 2 wherein the alkylbenzene is toluene.

4. A process according to claim 2 wherein the alkylbenzene is selected from the group consisting of xylene, mesitylene, ethylbenzene and cumene.

5. A process according to claim 1 wherein the silica to alumina mole ratio is less than about 100 to 1.

6. A process according to claim 5 wherein the Group VIII metal is selected from platinum, palladium, rhodium and ruthenium and comprises 0.05 to 2.0 weight percent of the aluminosilicate.

7. A process according to claim 5 wherein the Group VIII metal is selected from nickel, cobalt and iron and comprises 0.5 to 10.0 weight percent of the aluminosilicate.

8. A process according to claim 7 wherein a sulfided Group VI–B metal is associated with the aluminosilicate and comprises 0.5 to 20.0 weight percent thereof.

9. A process according to claim 5 wherein the silica to alumina mole ratio is between about 20 to 1 and about 60 to 1.

10. A process according to claim 1 wherein the process is conducted in the presence of hydrogen.

11. A process for disproportionating an alkylaromatic hydrocarbon which comprises contacting a hydrocarbon stream comprising an alkylaromatic hydrocarbon selected from the group consisting of alkylbenzenes having one to three $C_1$–$C_4$ alkyl groups and a sulfide compound under disproportionation conditions with a hydrogen aluminosilicate derived by increasing the silica to alumina mole ratio of mordenite to between about 20:1 and about 60:1 and impregnated with a sulfided Group VIII metal.

12. A process according to claim 11 wherein said disproportionation conditions comprise a temperature in the range of 400 to 750° F., a space velocity in the range of 0.1 to 10 liquid volumes per volume of catalyst per hour and pressure in the range of 0 to 1000 p.s.i.g.

13. A process according to claim 12 wherein the process is conducted in the presence of hydrogen, said hydrogen addition being in the range of 100 to 10,000 s.c.f./bbl. of alkylaromatic hydrocarbon feed.

14. A process according to claim 13 wherein the Group VIII metal is selected from platinum, palladium, rhodium and ruthenium and comprises 0.05 to 2 weight percent of the aluminosilicate.

15. A process according to claim 13 wherein the Group VIII metal is selected from nickel, cobalt and iron and comprises 0.05 to 10.0 weight percent of the aluminosilicate.

16. A process according to claim 15 wherein a sulfided Group VI–B metal is associated with the aluminosilicate and comprises 0.5 to 20.0 weight percent thereof.

17. A process according to claim 12 wherein the sulfide compound is selected from the group consisting of carbon disulfide, methyl sulfide and ethyl mercaptan.

18. A process according to claim 12 wherein the sulfide is hydrogen sulfide.

References Cited

UNITED STATES PATENTS

| | | | |
|---|---|---|---|
| 3,173,855 | 3/1965 | Miale et al. | 208—120 |
| 3,175,967 | 3/1965 | Miale et al. | 208—120 |
| 3,367,884 | 2/1968 | Reid | 252—455 |

DELBERT E. GANTZ, Primary Examiner

C. R. DAVIS, Assistant Examiner

U.S. Cl. X.R.

208—120; 252—455; 260—668